US007840242B2

(12) United States Patent
Yoshino

(10) Patent No.: US 7,840,242 B2
(45) Date of Patent: Nov. 23, 2010

(54) EARPHONE ANTENNA

(75) Inventor: Yoshitaka Yoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 11/538,736

(22) Filed: Oct. 4, 2006

(65) Prior Publication Data

US 2007/0105438 A1 May 10, 2007

(30) Foreign Application Priority Data

Oct. 7, 2005 (JP) ............................ 2005-295434

(51) Int. Cl.
*H04B 1/00* (2006.01)

(52) U.S. Cl. ...................... 455/575.2; 381/74; 381/370

(58) Field of Classification Search ................ 455/572, 455/569.1, 569.2, 575.2, 296–307, 270–278.1; 381/370–383, 55, 74, 111, 123, 77, 79; 343/718, 343/722; 349/577, 669
See application file for complete search history.

(56) References Cited

U.S. PATENT DOCUMENTS 4,369,521 A * 1/1983 Sawada ...................... 455/270
5,581,626 A * 12/1996 Palmer ...................... 381/103
7,292,705 B2 * 11/2007 Harano ...................... 381/384
2006/0166719 A1 * 7/2006 Arad et al. ............... 455/575.2

FOREIGN PATENT DOCUMENTS

JP 9-199237 7/1997
JP 2003-163529 6/2003

* cited by examiner

*Primary Examiner*—Rafael Pérez-Gutiérrez
*Assistant Examiner*—Marcos Batista
(74) *Attorney, Agent, or Firm*—K&L Gates LLP

(57) ABSTRACT

An earphone antenna includes: earphone cords; an earphone portion; a coaxial cable; and a pin plug connector portion; wherein the earphone cords cooperate with a shielded line of the coaxial cable using a connection point with the coaxial cable as a feeding point to constitute an antenna for receiving RF signals; wherein conductor lines constituting a core wire of the coaxial cable form signal lines for transmitting audio signals and a ground line; and wherein the coaxial cable is connected with a separation-superimposition circuit portion which is mounted at a side of the pin plug connector portion or at a side of a wireless electronic device and acts to separate the RF signals and the audio signals and to superimpose the audio signals.

5 Claims, 6 Drawing Sheets

EARPHONE ANTENNA

CROSS REFERENCES TO RELATED APPLICATIONS

The present application claims priority to Japanese Patent Application JP 2005-295434 filed in the Japanese Patent Office on Oct. 7, 2005, the entire contents of which being incorporated herein by reference.

BACKGROUND

The present disclosure relates to an earphone antenna through which a mixture of a radio-frequency signal (RF signal) and a low-frequency signal (such as audio signal and acoustic signal; hereafter collectively referred to as audio signal) is transmitted.

Mobile wireless electronic devices such as mobile liquid crystal television receivers, mobile radio receivers, and pagers which use earphone antennas have been offered (see, for example, JP-A-2003-163529 (patent reference 1)). Such an earphone antenna uses a signal line as an antenna to transmit audio signals to a rod antenna or to earphones.

In an antenna using a coaxial cable, a dedicated connector is used. A ferrite bead is inserted under the headphone terminal to remove noise superimposed on the audio signal (see, for example, JP-A-H9-199237 (patent reference 2)).

The present applicant has already offered an earphone antenna in which an antenna line is formed by an earphone cord and a coaxial cable. The total length of the earphone cord is about ½λ. The earphone cord and coaxial cable are connected to intermediate parts of the antenna line. The earphone antenna is equipped with a relay portion having a separation-superimposition circuit for separating or superimposing audio signals from or onto RF signals. In this earphone antenna, the relay portion is formed by a substrate on which a given pattern and ground are formed, as well as plural ferrite beads and chip capacitors mounted on the substrate.

This earphone antenna is constructed as described above. The relay portion is mounted in an intermediate part of the antenna line. Consequently, the cost is increased. Furthermore, the antenna is somewhat large in size and heavy. Therefore, it has been pointed out that the antenna may not be routed as freely as desired. Furthermore, in an earphone antenna, as described previously, a structure for interconnecting the earphone code and coaxial cable is mounted in the relay portion constituting a feeding point for the antenna line. In addition, the substrate on which the separation-superimposition circuit for separating or superimposing audio signals from or onto RF signals is mounted, as well as other components. For these reasons, the antenna characteristics are somewhat inferior to those of an independent antenna line.

Additionally, another problem common to earphone antennas is that noise countermeasure on the part of the connector portion connecting the earphone antenna with the body of the device is important. That is, in the connector portion made up of contact elements, an earphone antenna suffers from the problem that a countermeasure implemented by shielding independent transmission lines of the coaxial cable that transmits RF signals increases the size. In an earphone antenna, insertion of ferrite beads or other countermeasure is used to cope with the problem. However, this presents the problem that the design of the body of the device is limited.

Accordingly, it is desirable to provide an earphone antenna which alleviates the foregoing problems with the earphone antenna and thus reduces the cost and improves the antenna characteristics.

SUMMARY

An earphone antenna according to one embodiment includes earphone cords having a first and a second end sides; an earphone portion having earphones at the first end side of the earphone cords, the earphone portion having a connector element at the second end side; a coaxial cable having a core wire and a shielded line electrically insulated from the core wire, the core wire being made of at least two conductor lines kept electrically insulated from each other, the connector element of the earphone portion being withdrawably attached to one end side of the cable, the coaxial cable having a connector body interconnecting the conductor lines and the earphone cords; and a connector portion mounted at the other end side of the coaxial cable, the connector portion being connected with a mobile wireless electronic device. In the earphone antenna, the coaxial cable is mounted on the connector side or wireless electronic device side, and is connected with a separation-superimposition circuit portion acting to separate RF and low-frequency signals and to superimpose the low-frequency signals.

In the earphone antenna, the earphone cords cooperate with the shielded line to constitute an antenna, so that the earphone codes receive RF signals. The shielded line has a feeding point formed by a joint point to the coaxial cable by connecting the connector element with the connector body. In the earphone antenna, the coaxial cable constitutes a transmission line for RF signals received using the core wire while employing the shielded line as a ground. At least two conductor lines constituting the core wire form signal lines and a ground line, the signal lines acting to transmit low-frequency signals to the earphones via the earphone cords.

Furthermore, in the earphone antenna, the earphone portion is a stereophonic earphone portion having left and right earphones, left and right signal lines, and ground lines. The core wire of the coaxial cable is formed by three conductor lines which are kept electrically isolated from each other. The three conductor lines connect the pair of signal lines of the earphone codes and the commonly connected ground lines, respectively.

In an earphone antenna according to one embodiment, the earphone cords and coaxial cable are connected by a simple structure. The earphone cords constitute lines for transmitting received RF signals and low-frequency signals supplied from the body of the device. The coaxial cable has the core wire and the shielded line, the core wire being made of at least two conductor lines. Consequently, the cost is reduced. Also, reduced size and weight are achieved. Hence, operabilities such as routing of wire are facilitated. Furthermore, loss in the feeding portion is reduced. As a result, the antenna characteristics are improved.

Additional features and advantages are described herein, and will be apparent from, the following Detailed Description and the figures.

DETAILED DESCRIPTION

Figure 1:
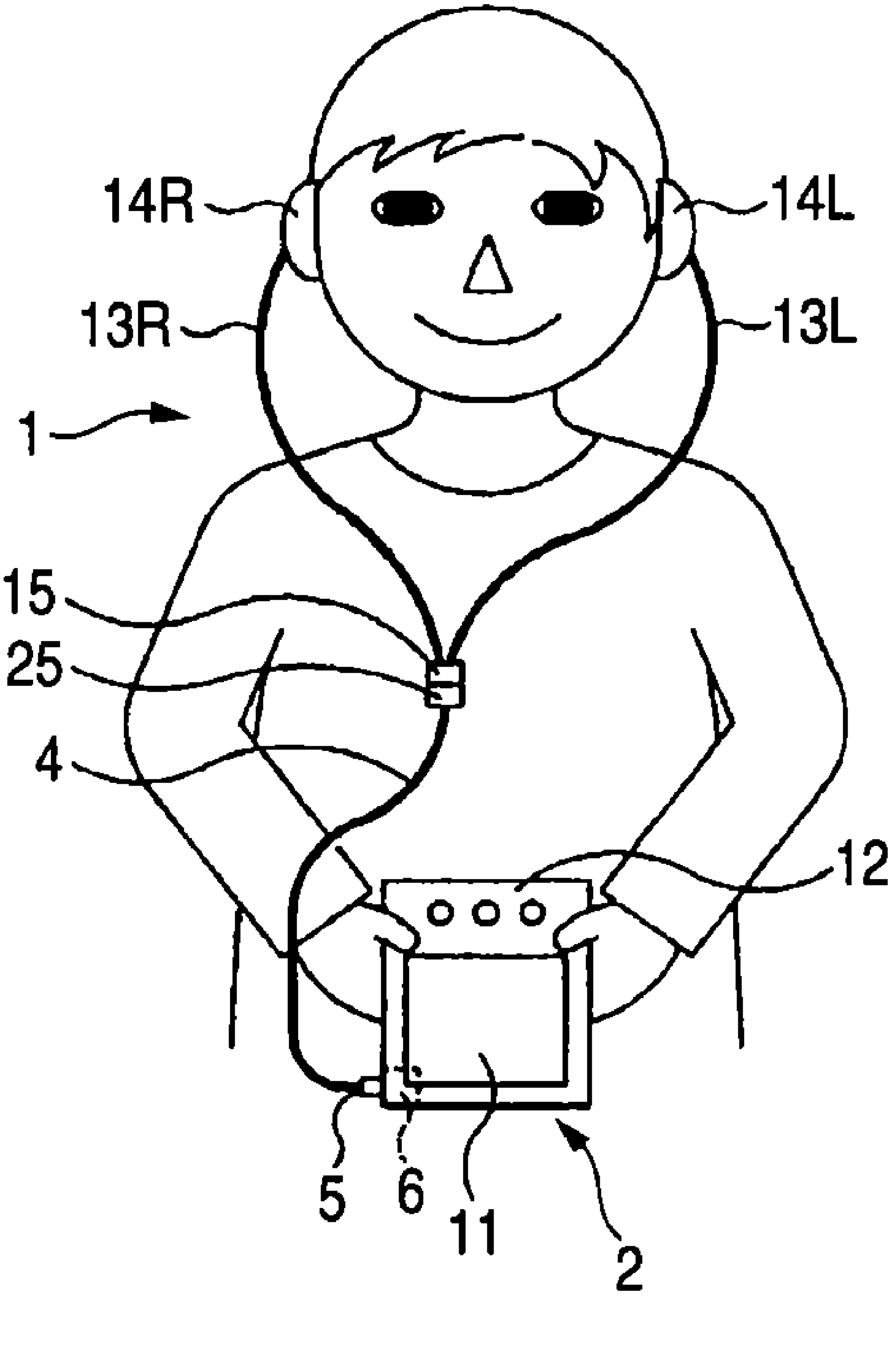
FIG. 1 is an explanatory view illustrating the manner in which an earphone antenna according to one embodiment is used in a liquid crystal television.

An embodiment of an earphone antenna 1, as shown in the drawings, is hereinafter described in detail. The earphone antenna 1 is withdrawably attached, for example, to a portable liquid crystal television receiver (hereinafter simply referred to as the liquid crystal TV) 2 in use as shown in FIG. 1. The antenna receives VHF (very high frequency) TV broadcast programs and UHF (ultrahigh frequency) TV broadcast programs and transmits RF signals to the liquid crystal TV 2. The antenna also transmits audio signals delivered from the liquid crystal TV 2 and radiates sound. The earphone antenna 1 is made up of an earphone portion 3, a coaxial cable 4, and a pin plug connector 5. The pin plug connector 5 is attached to or detached from a connector 6 on the side of the liquid crystal TV 2.

Figure 2:
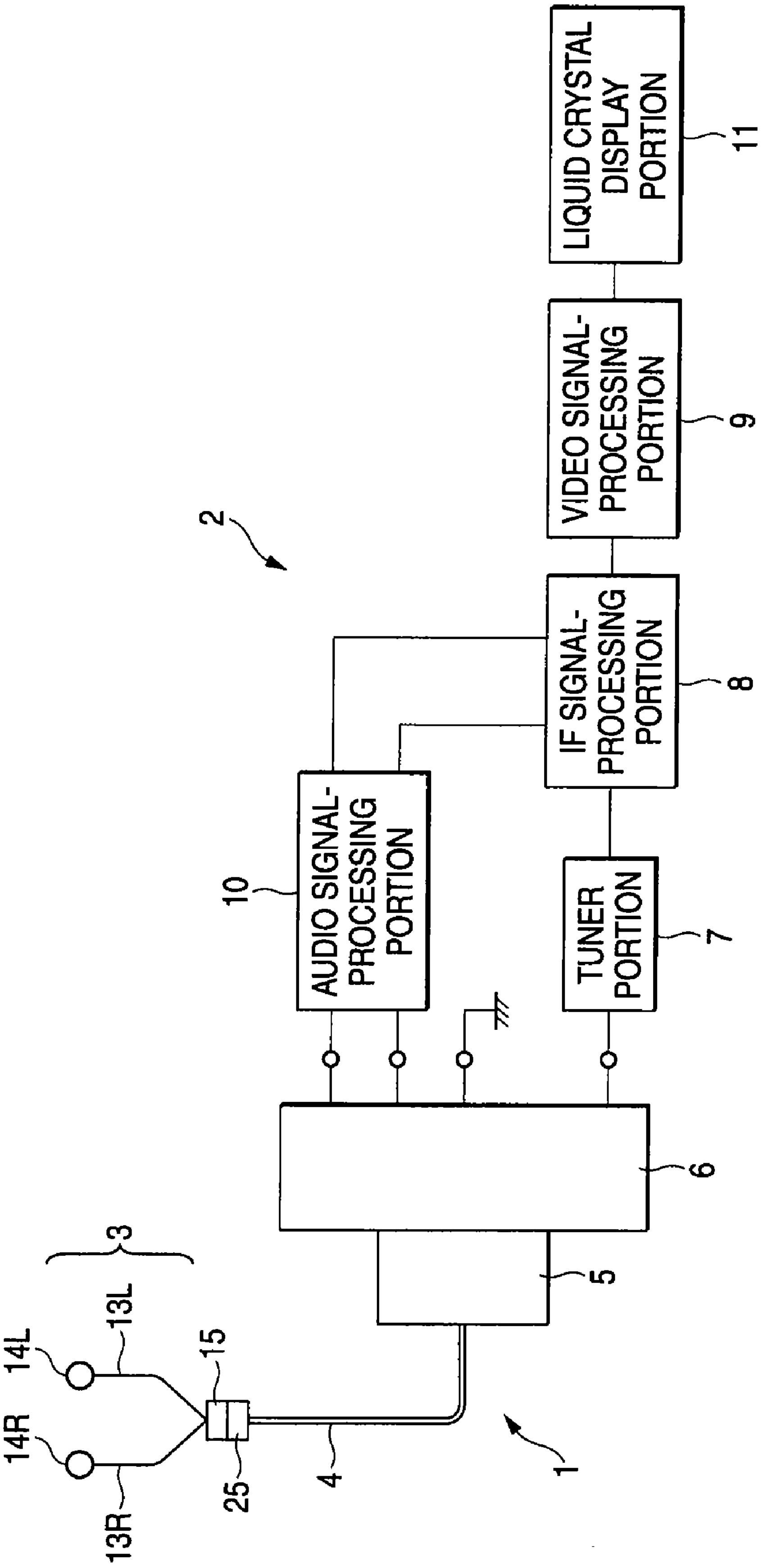
FIG. 2 is a block diagram of the earphone antenna and the liquid crystal television.

As shown in FIG. 2, the liquid crystal TV 2 has a tuner portion 7, an intermediate frequency (IF) signal-processing portion 8 connected to the tuner portion 7, a video signal-processing portion 9 connected to the intermediate frequency signal-processing portion 8, and an audio signal-processing portion 10. The liquid crystal TV 2 further includes a liquid crystal display portion 11 connected with the video signal-processing portion 9, the above-described connector 6, and other parts. The liquid crystal TV 2 receives electric waves in various channels such as TV broadcast bands or FM (frequency-modulation) broadcast bands by the earphone antenna 1 (described later in detail), displays pictures of the received broadcasts by means of the liquid crystal display portion 11, and outputs the audio signal by means of the earphone portion 3.

With respect to the liquid crystal TV 2, a manipulation for turning on and off the power supply, a manipulation for switching the channel, or a manipulation for adjusting the sound volume is performed using a manipulation portion 12 (whose details are omitted) mounted on the enclosure. The liquid crystal TV 2 has a built-in rechargeable secondary battery (not shown) and can be carried. The liquid crystal TV can be connected, for example, with a commercial power supply for domestic use or in-vehicle battery for use of the TV. The liquid crystal TV 2 may have a second connector portion (not shown) and be connected with an external device such as a personal computer. The TV may have an internal memory such as a hard disk or have a function of playing back an appropriate external storage medium.

The liquid crystal TV 2 selects, at its tuner portion 7, RF signals of electric waves of the desired channel from broadcast waves received by the earphone antenna 1, amplifies the RF signals, and outputs the amplified signals to the intermediate frequency signal-processing portion 8. The liquid crystal TV 2 converts, at the intermediate frequency signal-processing portion 8, the signals into desired intermediate frequency signals, outputs an image signal to the video signal-processing portion 9, and outputs audio signals to the audio signal-processing portion 10. In the liquid crystal TV 2, a video signal is output from the video signal-processing portion 9 to the liquid crystal display portion 11. Audio signals are output from the audio signal-processing portion 10 to the earphone portion 3 via an audio signal amplifier circuit (not shown) and via the connector 6. The liquid crystal TV 2 may have built-in speakers, for example, such that audio signals may be output from the built-in speakers.

Figure 3:
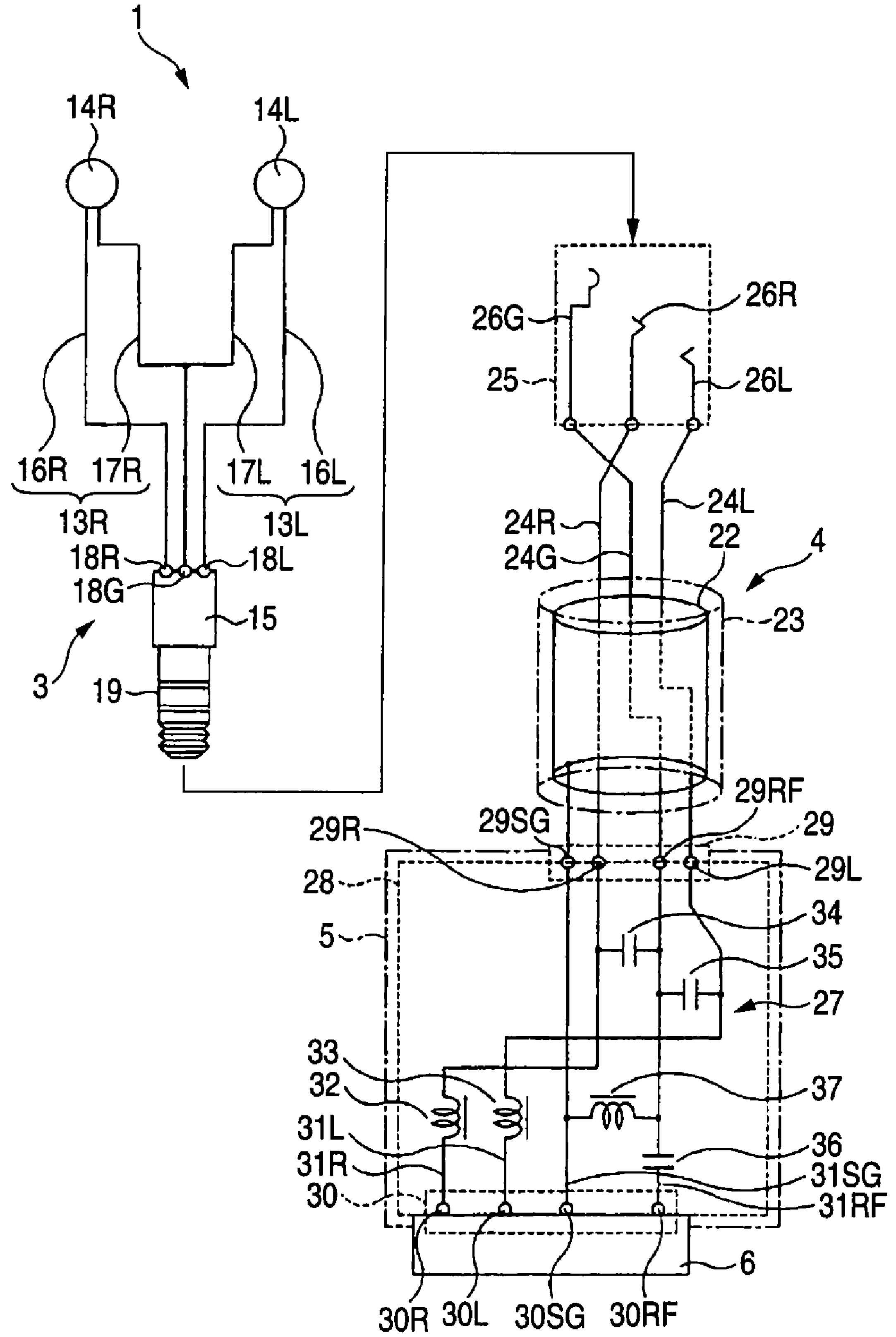
FIG. 3 is a circuit diagram of the earphone antenna.

The earphone portion 3 of the earphone antenna 1 is made up of two earphone cords 13R, 13L (hereinafter collectively referred to as the earphone cords 13 unless explicitly stated otherwise), stereophonic earphones 14R and 14L (hereinafter collectively referred to as the earphones 14 unless explicitly stated otherwise) connected to their respective opposite ends of the earphone cords 13, and a pin jack 15 of a three-terminal structure as shown in FIG. 3. The pin jack is mounted at the other ends of the earphone cords 13 and forms a connector adapted to be connected to the coaxial cable 4. The earphone portion 3 is formed by earphone cords 13R and 13L each of which is made of a pair of lines. That is, the cord 13R is formed by an audio signal line 16R and a ground line 17R. The cord 13L is formed by an audio signal line 16L and a ground line 17L.

The pin jack 15 has two terminal portions, i.e., a first terminal portion 18R and a second terminal portion 18L. The audio signal lines 16R and 16L of the earphone cords 13 are independently connected with the first terminal portion 18R and second terminal portion 18L, respectively. The pin jack 15 further includes a third terminal portion 18G to which the ground lines 17R and 17L are commonly connected. The earphone cords 13 form transmission paths for audio signals delivered from the audio signal-processing portion 10 of the liquid crystal TV 2. Furthermore, the earphone codes form an antenna element (described in detail later) whose one end is opened. The antenna element uses the junction point with the coaxial cable 4 at the other end side as a feeding point.

As is known in the art, the pin jack 15 has the aforementioned three terminal portions (i.e., first terminal portion 18R, second terminal portion 18L, and third terminal portion 18G) at one end side of an insulated cylindrical portion, the three terminal portions being mounted coaxially. A pin terminal portion 19 of a coaxial three-pin terminal structure (whose details are omitted) is mounted at the other end side of the insulated cylindrical portion. In the pin jack 15, the terminal portions are wired through the insulated cylindrical portion and connected with their respective opposite terminal portions of the pin terminal portion 19.

Figure 4:
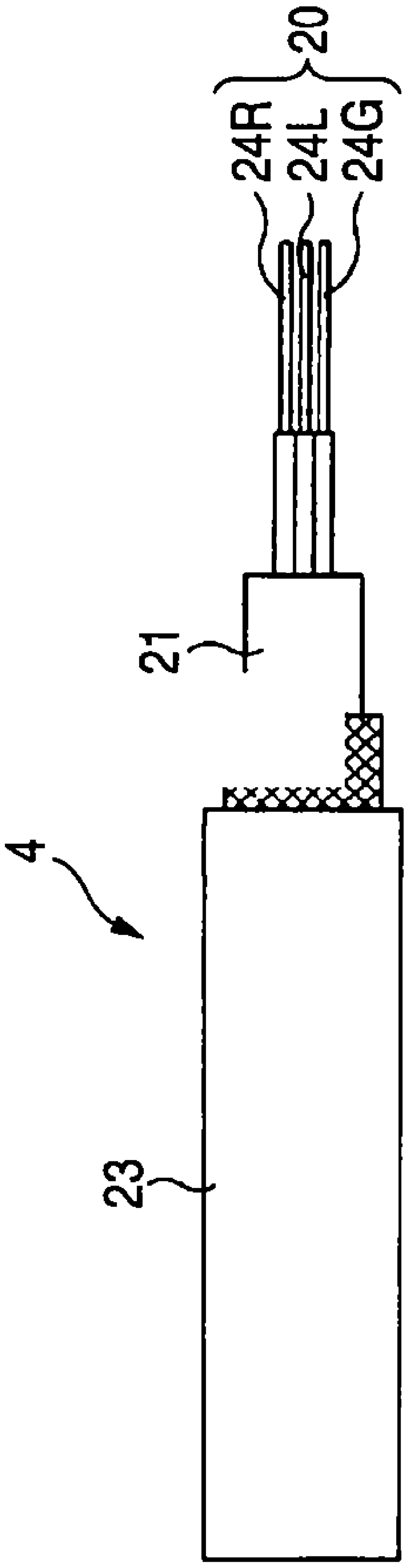
FIG. 4 is a diagram of a coaxial cable used in the earphone antenna.
Figure 5A:
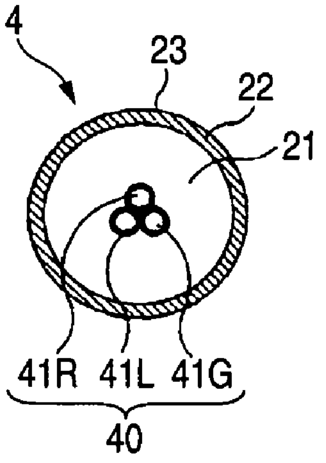
FIGS. 5A and 5B are cross sections of other coaxial cables used in the earphone antenna.
Figure 5B:
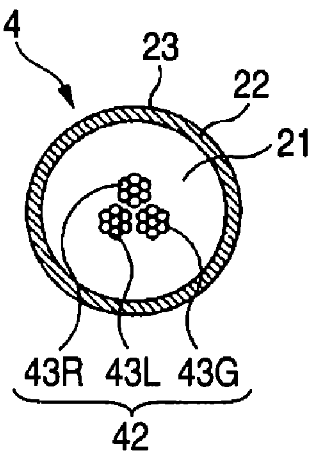
Figure 5C:
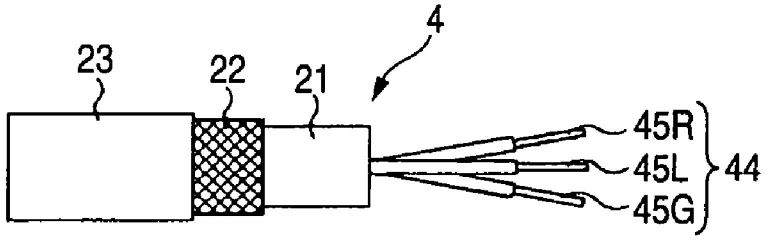
FIGS. 5C and 5D are side elevations of still other coaxial cables used in the earphone antenna.
Figure 5D:
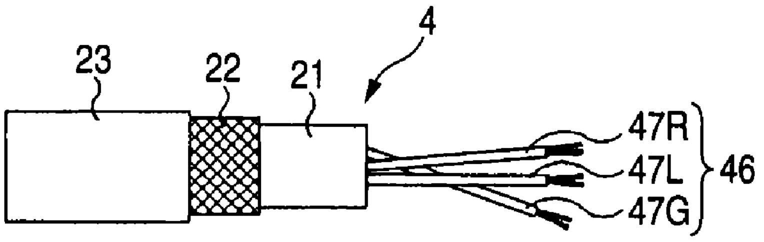

As shown in FIGS. 3 and 4, the coaxial cable 4 is similar in structure to a generally used, well-known coaxial cable. The cable has a core wire 20 coated with an insulating material 21. The outer periphery of the insulating material 21 is coated with a shielded line 22 made of mesh or the like. The whole assembly is coated with an outer sheath 23 made of an insulating material such as an insulating tube. In the coaxial cable 4, the core wire 20 is made of three conductor lines (i.e., first conductor line 24R, second conductor line 24L, and third conductor line 24G) which are kept electrically insulated from each other as shown in FIG. 4.

As described in detail below, in the coaxial cable 4, the first conductor line 24R and third conductor line 24G forming the core wire 20 constitute a transmission line for transmitting an R audio signal to the stereophonic earphone 14R. The second conductor line 24L and third conductor line 24G constitute a transmission line for transmitting an L audio signal to the stereophonic earphone 14L. In the coaxial cable 4, the core wire 20 made of the first conductor line 24R through third core wire 24G cooperates with the shielded line 22 to constitute a transmission line for supplying RF signals to the separation-superimposition circuit portion 27. As described in detail later, in the coaxial cable 4, the third core wire 24G is used as a transmission line for RF signals.

In the coaxial cable 4, a pin connector 25 to and from which the pin jack 15 of the earphone cords 13 is attached and removed is mounted at one end side. In the pin connector 25, three terminal elements 26R, 26L, and 26G which are kept electrically insulated from each other as shown in FIG. 3 are mounted in an insulating enclosure provided with a fitting hole in which the pin terminal portion 19 of the pin jack 15 is fitted at one side in a manner not described in detail. In the pin connector 25, the audio signal line 16R is connected with the first terminal element 26R by fitting the pin terminal portion 19 of the pin jack 15 into the fitting hole. Also, the audio signal line 16L is connected with the second terminal element 26L. The commonly connected ground lines 17R and 17L are connected with the third terminal element 26G. After the various lines are connected, the coaxial cable 4 and pin connector 25 are integrated by coating the connected parts with an insulating material.

At the other end side of the coaxial cable 4, the outer sheath 23 and insulating material 21 have been peeled off and pulled out to obtain the conductor lines 24 and shielded line 22 which are connected with the pin plug connector 5 as described previously. Fundamentally, the pin plug connector 5 has a connector structure equivalent to a so-called 10-pin flat connector used, for example, in a mobile phone for connection with an external device. The pin plug connector 5 includes an insulating enclosure having a built-in printed-wiring board 28 on which a separation-superimposition circuit portion 27 is formed to separate audio and RF signals and superimpose the audio signals on the coaxial cable 4 as described in detail later. A connector terminal 29 for connecting the mutually opposite conductors 24 and shielded line 22 of the coaxial cable 4 is formed at one end side of the printed-wiring board 28. A pin plug portion 30 connected with the connector 6 of the liquid crystal TV 2 is mounted at the other end side via the separation-superimposition circuit portion 27.

In the pin plug connector 5, the connector terminal 29 is made up of four connector terminals, i.e., 29R, 29L, 29RF, and 29SG. The first conductor line 24R is connected with the first connector terminal 29R. The second conductor line 24L is connected with the second connector terminal 29L. The third conductor line 24G is connected with the third connector terminal 29RF. The shielded line 22 is connected with the fourth connector terminal 29SG. In the pin plug connector 5, the pin plug portion 30 also has four pin terminals 30R, 30L, 30RF, and 30SG which are connected with their respective opposite connector terminals 29R, 29L, 29RF, and 29SG via the separation-superimposition circuit portion 27. Furthermore, the four pin terminals are connected with their respective opposite terminals (whose details are omitted) mounted on the connector 6 of the liquid crystal TV 2.

Because the pin plug connector 5 is connected with the connector 6, the conductor lines 24 and shielded line 22 of the coaxial cable 4 are connected with the tuner portion 7 and audio signal-processing portion 10, respectively, of the liquid crystal TV 2 via the separation-superimposition circuit portion 27. The first pin terminal 30R of the pin plug connector 5 connects the first conductor line 24R as a transmission line for R audio signal with the audio signal-processing portion 10. The second pin terminal 30L of the pin plug connector 5 connects the second conductor line 24L as a transmission line for L audio signal with the audio signal-processing portion 10. The third pin terminal 30RF of the pin plug connector 5 connects the third conductor line 24G as a transmission line for RF signals with the tuner portion 7. The fourth pin terminal 30SG of the pin plug connector 5 connects the shielded line 22 to ground such that the shield line acts a ground for audio and RF signals.

Patterns (i.e., R audio signal transmission pattern 31R, L audio signal transmission pattern 31L, RF signal pattern 31RF, and audio/RF signal ground pattern 31SG) are formed on the printed-wiring board 28 of the separation-superimposition circuit portion 27. The R audio signal transmission pattern 31R of the separation-superimposition circuit portion 27 connects the first connector terminal 29R and first pin terminal 30R. The L audio signal transmission pattern 31L of the separation-superimposition circuit portion 27 connects the second connector terminal 29L and second pin terminal 30L.

The RF signal pattern 31RF of the separation-superimposition circuit portion 27 connects the third connector terminal 29RF and third pin terminal 30RF. The audio/RF signal ground pattern 31SG of the separation-superimposition circuit portion 27 connects the fourth connector terminal 29SG and fourth pin terminal 30SG.

In the separation-superimposition circuit portion 27, the R audio signal transmission pattern 31R and L audio signal transmission pattern 31L have a first high-frequency choke 32 and a second high-frequency choke 33, respectively. The separation-superimposition circuit portion 27 has a first capacitor 34 for connecting the R audio signal transmission pattern 31R and RF signal pattern 31RF and a second capacitor 35 for connecting the L audio signal transmission pattern 31L and RF signal pattern 31RF. In the separation-superimposition circuit portion 27, the RF signal pattern 31RF has a third capacitor 36. Furthermore, the separation-superimposition circuit portion 27 has a third high-frequency choke 37 for connecting the RF signal pattern 31RF and audio/RF signal ground pattern 31SG.

Ferrite beads which show low impedance in a low-frequency band (20 kHz or lower) of audio signals and high impedance (1 kΩ or higher) in a high-frequency band of RF signals are used in the first high-frequency choke 32, second high-frequency choke 33, and third high-frequency choke 37. Chip capacitors having desired capacitive characteristics are used in the first capacitor 34 through third capacitor 36.

In the R audio signal transmission pattern 31R and L audio signal transmission pattern 31L, the first high-frequency choke 32 and second high-frequency choke 33 are located closer to the pin plug portion 30 than the first capacitor 34 and second capacitor 35, respectively. The third high-frequency choke 37 is located between the second capacitor 35 and third capacitor 36 and connected with the RF signal pattern 31RF and audio/RF signal ground pattern 31SG. The first capacitor 34 through third capacitor 36 show high impedance in the low-frequency band of audio signals and low impedance in the high-frequency band of RF signals.

The separation-superimposition circuit portion 27 is equipped with the first capacitor 34 and second capacitor 35 as described previously. The circuit portion 27 is not limited to this structure. The R audio signal transmission pattern 31R and L audio signal transmission pattern 31L of the separation-superimposition circuit portion 27 may be capacitively coupled to the RF signal pattern 31RF and thus are isolated from each other in the low-frequency band but are coupled at the high-frequency band. The R audio signal transmission pattern 31R and L audio signal transmission pattern 31L of the separation-superimposition circuit portion 27 are placed so close to each other, for example, on the printed-wiring board 28 that the patterns 31R and 31L are capacitively coupled. This dispenses with the first capacitor 34 and second capacitor 35.

In the separation-superimposition circuit portion 27 constructed in this way, the first high-frequency choke 32 and second high-frequency choke 33 permit an audio signal supplied from the liquid crystal TV 2 via the pin terminals 30 to pass through the chokes 32 and 33 such that the audio signal is superimposed on the R audio signal transmission pattern 31R and L audio signal transmission pattern 31L. In the separation-superimposition circuit portion 27, the first capacitor 34 and second capacitor 35 act to separate the R audio signal transmission pattern 31R, RF signal pattern 31RF, L audio signal transmission pattern 31L, and RF signal pattern 31RF for audio signals in the low-frequency band but integrate them for RF signals in the high-frequency band.

In the separation-superimposition circuit portion 27, the third connector terminal 29RF is connected with the third conductor line 24G on the side of the coaxial cable 4 acting as a ground in the audio signal transmission system as described previously. The third connector terminal 29RF is connected with the audio/RF signal ground pattern 31SG via the third high-frequency choke 37 that shows high impedance in the high-frequency band but low impedance in the low-frequency band. The third connector terminal 29RF is connected with the RF signal pattern 31RF via the third capacitor 36 that shows high impedance in the low-frequency band but low impedance in the high-frequency band. Accordingly, in the separation-superimposition circuit portion 27, the audio/RF signal ground pattern 31SG acts as a ground line in the low-frequency band of audio signals.

Accordingly, in the separation-superimposition circuit portion 27, the aforementioned structure separates the audio signal lines 16 and ground lines 17 of the earphone cords 13 from the antenna line in the low-frequency band of audio signals. In the separation-superimposition circuit portion 27, R audio signals transmitted by the R audio signal transmission pattern 31R and audio/RF signal ground pattern 31SG are output to the earphone portion 3. Moreover, in the separation-superimposition circuit portion 27, L audio signals transmitted by the L audio signal transmission pattern 31L and audio/RF signal ground pattern 31SG are output to the earphone portion 3.

Furthermore, in the separation-superimposition circuit portion 27, the three conductor lines 24 constituting the core wire 20 of the coaxial cable 4 are capacitively coupled by the first capacitor 34 through third capacitor 36 and thus are integrated in the high-frequency band. In the separation-superimposition circuit portion 27, the earphone cords 13 constituting the antenna elements are connected with the core wire 20 of the coaxial cable 4 via the pin jack 15 coupled to the pin connector 25 as described above. Thus, the received RF signal is transmitted by the core wire 20 and entered using the shielded line 22 as a ground.

In the separation-superimposition circuit portion 27, the RF signal transmitted to the R audio signal transmission pattern 31R and L audio signal transmission pattern 31L is cut off by the first high-frequency choke 32 and second high-frequency choke 33. Accordingly, in the separation-superimposition circuit portion 27, the RF signal is entered into the liquid crystal TV 2 via the connector 6 coupled to the pin plug connector 5 from the third pin terminal 30RF and from the fourth pin terminal 30SG using the RF signal ground pattern 31SG as a ground and using the RF signal pattern 31RF as a transmission line.

In the earphone antenna 1 constructed in this way, the earphone portion 3 couples the pin jack 15 to the pin connector 25 as shown in FIG. 1 and thus the earphone portion is connected with the coaxial cable 4. The earphone antenna 1 is connected with the liquid crystal TV 2 by coupling the pin plug connector 5 to the connector 6. In the earphone antenna 1, the earphone cords 13 having a given length constitute antenna elements which receive an RF signal and output it to the liquid crystal TV 2. Audio signals output from the liquid crystal TV 2 are produced as sound from the stereophonic earphones 14R and 14L of the earphone portion 3.

In the earphone antenna 1, the RF signal received by the earphone cords 13 is input to the separation-superimposition circuit portion 27 mounted in the pin plug connector 5 via the pin jack 15 and pin connector 25 coupled from the earphone portion 3, using the core wire 20 of the coaxial cable 4 and the shielded line 22 as transmission lines. In the earphone antenna 1, the separation-superimposition circuit portion 27 cuts off the RF signal transmitted to the R audio signal transmission pattern 31R and L audio signal transmission pattern 31L via the first conductor line 24R and second conductor line 24L forming the core wire 20 by means of the first high-frequency choke 32 and second high-frequency choke 33. In the earphone antenna 1, the separation-superimposition circuit portion 27 enters the RF signal into the liquid crystal TV 2, using the audio/RF signal ground pattern 31SG connected with the shielded line 22 as a ground and using the RF signal pattern 31RF connected with the third conductor line 24G of the coaxial cable 4 as a transmission line.

In the earphone antenna 1, the separation-superimposition circuit portion 27 superimposes the audio signal delivered from the liquid crystal TV 2 onto the R audio signal transmission pattern 31R and L audio signal transmission pattern 31L by means of the first high-frequency choke 32 and second high-frequency choke 33. In the earphone antenna 1, the R audio signal is supplied to the stereophonic earphone 14R through a route formed by the R audio signal transmission pattern 31R, first connector terminal 29R, first conductor line 24R, first terminal element 26R, and audio signal line 16R, using the audio/RF signal ground pattern 31SG connected with the third connector terminal 29RF via the third high-frequency choke 37 as a ground. Furthermore, in the earphone antenna 1, the signal is supplied to the stereophonic earphone 14L through a route formed by the L audio signal transmission pattern 31L, second connector terminal 29L, second conductor line 24L, second terminal element 26L, and audio signal line 16L, using the audio/RF signal ground pattern 31SG as a ground.

In the earphone antenna 1, the above-described coaxial cable 4 may form the core wire by any of conductor line structures shown in FIGS. 5A-5D. In a core wire 40 shown in FIG. 5A, each of three conductor lines 41R, 41L, and 41G is formed by a single untwisted, coated conductor line. In a core wire 42 shown in FIG. 5B, each of three conductor lines 43R, 43L, and 43G is formed by a twisted coated conductor. In a core wire 44 shown in FIG. 5C, each of three conductor lines 45R, 45L, and 45G is formed by plural untwisted, coated conductor lines or a twisted coated conductor. In a core wire 46 shown in FIG. 5D, each of three conductor lines 47R, 47L, and 47G is formed by a litz wire fabricated by twisting multiple conductors to reduce the high-frequency resistance, the multiple conductors being each electrically insulated.

In the earphone antenna 1, a 10-pin flat connector having the built-in printed-wiring board 28 on which the separation-superimposition circuit portion 27 is formed is used as the pin plug connector 5 for connection with the liquid crystal TV 2. Alternatively, a connector structure using a plug and a jack, for example, may also be used. In this case, the same functions as those of the separation-superimposition circuit portion 27 may be imparted to the earphone antenna 1 or some of the functions may be imparted to the liquid crystal TV 2.

In the earphone antenna 1, the earphone portion 3 has the pair of earphone cords 13R, 13L and the pair of stereophonic earphones 14R, 14L. Where audio signals are reproduced monophonically, for example, the earphone portion is made of a single earphone cord and a single earphone. In this case, the earphone antenna 1 can use a coaxial cable whose core wire is formed by two conductor lines including one audio signal line and one ground line. In the earphone antenna 1, the separation-superimposition circuit portion is made of fewer high-frequency chokes and fewer chip capacitors. In this separation-superimposition circuit portion, a high-frequency choke is connected with one conductor line, and a chip capacitor is connected with the other conductor line. The conductor lines are capacitively coupled by a chip capacitor. In the separation-superimposition circuit portion, patterns connected with a shielded line are grounded.

In the earphone antenna 1, a coaxial cable whose core wire is formed by plural coated conductor lines may also be used. The earphone antenna 1 may also be so designed that a pin connector having a fixed terminal is used as the pin connector 25 and that connection or disconnection with the fixed terminal is detected to judge whether the earphone portion 3 is connected or not. Depending on the result of the judgment, the output of an audio signal from the liquid crystal TV 2 is switched.

In the earphone antenna 1, antenna elements are constituted including the shielded line 22 of the coaxial cable 4 and so in a case where the cable length is λ/4 for the ground of the liquid crystal TV 2, the characteristics of the antenna are deteriorated greatly due to the effects of the human body. Accordingly, the earphone antenna 1 may have a separation-superimposition circuit portion 50 shown as a second embodiment in FIG. 6 instead of the above-described separation-superimposition circuit portion 27. The separation-superimposition circuit portion 50 is characterized in that it has a fourth capacitor 51 for breaking the coupling with the ground on the side of the liquid crystal TV 2 in a desired frequency band. The separation-superimposition circuit portion 50 is similar with the above-described separation-superimposition circuit portion 27 in other respects and, therefore, corresponding components are denoted by the same references numerals and their description is omitted.

That is, in the earphone antenna 1, assuming that the length of the coaxial cable is λ/4 (about 75 cm) at 100 MHz, the ground on the side of the liquid crystal TV 2 and the shielded line 22 of the coaxial cable 4 together form an antenna element, inducing a high-frequency current. Therefore, when the enclosure of the liquid crystal TV 2 is gripped, the antenna characteristics are greatly deteriorated due to the effects of the human body. The earphone antenna 1 is hardly affected by the human body because UHF broadcast radio waves are produced by harmonic excitation.

Figure 6:
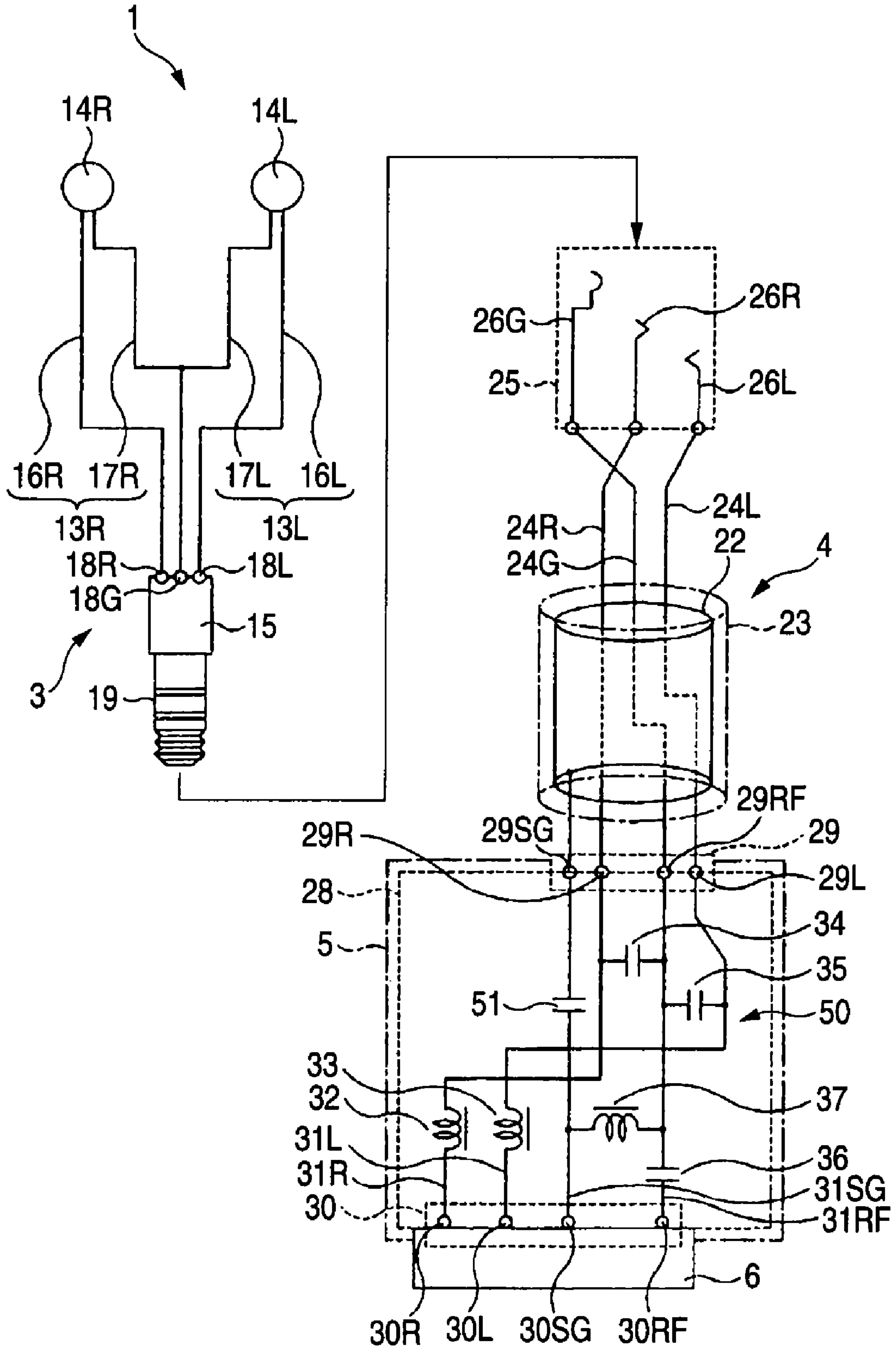
FIG. 6 is a circuit diagram of an earphone antenna having other separation-superimposition circuit portion

In the earphone antenna 1, the separation-superimposition circuit portion 50 has a fourth capacitor 51 formed on the audio/RF signal ground pattern 31SG for connecting the fourth connector terminal 29SG and fourth pin terminal 30SG as shown in FIG. 6. The fourth capacitor 51 has a capacitance of 20 pF, for example, and shows high impedance in the VHF range (30 MHz to 300 MHz) and low impedance in the UHF range (300 MHz to 3000 MHz).

Therefore, in the earphone antenna 1, the fourth pin terminal 30SG with which the audio/RF signal ground pattern 31SG is connected is isolated from the ground on the side of the liquid crystal TV 2 by the fourth capacitor 51 in the VHF TV broadcast reception mode. Even where the enclosure of the liquid crystal TV 2 is gripped, the earphone antenna 1 can be prevented from being affected by the human body. Rather, desired antenna characteristics are exhibited. In the earphone antenna 1, the fourth capacitor 51 assumes a low impedance in the UHF TV broadcast reception mode, and the fourth pin terminal 30SG is connected with the ground on the side of the liquid crystal TV 2. Because of the aforementioned UHF broadcast electric waves, when the enclosure is gripped, the antenna is not affected by the human body. Consequently, desired antenna characteristics are exhibited.

It is to be understood that the earphone antenna 1 is not limited to the fourth capacitor 51 described above. Of course, any of various functional elements for separating the audio/RF signal ground pattern 31SG and the ground on the side of the liquid crystal TV 2 in the desired frequency range may be used.

In the description of the above-described embodiment, the earphone antenna 1 is attached to and removed from the liquid crystal TV 2. Obviously, the present invention is not limited to this example of application. The earphone antenna 1 can also be used in various kinds of mobile wireless electronic devices such as mobile radio receivers and pagers.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An earphone antenna comprising:

earphone cords having a first end side and a second end side;

an earphone portion having earphones at the first end side of the earphone cords, and an earphone connector element at the second end side of the earphone cords;

a coaxial cable having a core wire including at least two conductor lines kept electrically insulated from each other, a shielded line electrically shielded from the core wire, a connector body interconnecting the conductor lines and the earphone cords, the earphone connector element being withdrawably attached to a first end side of the coaxial cable, a pin plug connector portion mounted at a second end side of the coaxial cable, the pin plug connector portion being connectable to a mobile wireless electronic device, and a separation-superimposition circuit portion housed in the pin plug connector portion of the coaxial cable and which acts to separate RF signals and audio signals and to superimpose the audio signals, wherein the earphone cords cooperate with the shielded line of the coaxial cable using a connection point with the coaxial cable as a feeding point to constitute an antenna for receiving RF signals, and wherein the conductor lines constituting the core wire of the coaxial cable form signal lines for transmitting audio signals and form a ground line.

2. The earphone antenna according to claim 1, wherein the earphone portion is a stereophonic earphone portion having a left ear phone, a right earphone, and earphone cords including a left signal line and a right signal line and ground lines, and wherein the coaxial cable has three conductor lines to constitute the core wire, the three conductor lines being kept electrically insulated from each other, the three conductor lines being connected with the signal lines of the earphone cords and the commonly connected ground lines, respectively.

3. The earphone antenna according to claim 1, wherein the separation-superimposition circuit portion has a functional element for disconnecting a ground for the RF signals and a ground on a side of the wireless electronic device in a given frequency range.

4. The earphone antenna according to claim 1, wherein the shielded line acts as a ground for audio signals and RF signals.

5. The earphone antenna according to claim 1, wherein the separation-superimposition circuit portion housed in the pin plug connector portion of the coaxial cable includes a choke for connecting a RF signal pattern and a ground pattern.

* * * * *